(12) United States Patent
Itoh (10) Patent No.: US 12,080,167 B2
(45) Date of Patent: Sep. 3, 2024

(54) PARKING MANAGEMENT APPARATUS, PARKING MANAGEMENT SYSTEM, PARKING MANAGEMENT METHOD, AND PARKING MANAGEMENT PROGRAM

(71) Applicant: TOYOTA JIDOSHA KABUSHIKI KAISHA, Toyota (JP)

(72) Inventor: Masayuki Itoh, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 17/967,353

(22) Filed: Oct. 17, 2022

(65) Prior Publication Data

US 2023/0123466 A1    Apr. 20, 2023

(30) Foreign Application Priority Data

Oct. 20, 2021  (JP) ................................. 2021-171488

(51) Int. Cl.
*G08G 1/14*     (2006.01)
*G06Q 20/14*    (2012.01)

(52) U.S. Cl.
CPC ........... *G08G 1/148* (2013.01); *G06Q 20/145* (2013.01); *G08G 1/144* (2013.01)

(58) Field of Classification Search
CPC ............................... G08G 1/148; G08G 1/144
See application file for complete search history.

(56) References Cited

U.S. PATENT DOCUMENTS

| 11,107,354 B2 * | 8/2021 | Nakka ................... G06V 10/82 |
| 2008/0033640 A1 | 2/2008 | Amano |
| 2012/0044091 A1 * | 2/2012 | Kim ....................... G08G 1/143 |
| | | 340/932.2 |
| 2012/0299749 A1 * | 11/2012 | Xiao ..................... G08G 1/148 |
| | | 340/932.2 |
| 2018/0300777 A1 | 10/2018 | Koreishi |
| 2022/0253754 A1 | 8/2022 | Shin et al. |

FOREIGN PATENT DOCUMENTS

| JP | 2002-303520 A | 10/2002 |
| JP | 2003-030744 A | 1/2003 |
| JP | 2017-067466 A | 4/2017 |

(Continued)

*Primary Examiner* — John A Tweel, Jr.
(74) *Attorney, Agent, or Firm* — Dinsmore & Shohl LLP (57) ABSTRACT

A parking management apparatus capable of starting management of a parking service without requiring use of ancillary facilities of a parking lot is provided. A parking management apparatus that manages a parking service, including: a position information acquisition unit that acquires position information of a vehicle; a destination information acquisition unit that acquires destination information of the vehicle; a creation unit that creates vicinity parking lot information of a vicinity of a destination provided to the vehicle based on the position information of the vehicle, the destination information of the vehicle, and wide-area parking lot information; and a management unit that specifies a parking lot where the vehicle has entered based on the position information of the vehicle and the wide-area parking lot information or the vicinity parking lot information and starts the management of the parking service in the parking lot.

5 Claims, 7 Drawing Sheets

(56) References Cited

FOREIGN PATENT DOCUMENTS

| | | |
|---|---|---|
| JP | 2018-181060 A | 11/2018 |
| JP | 2021-064344 A | 4/2021 |
| JP | 2021-140410 A | 9/2021 |
| KR | 2021-0035500 A | 4/2021 |
| WO | 2021/006488 A1 | 1/2021 |

* cited by examiner

PARKING MANAGEMENT APPARATUS, PARKING MANAGEMENT SYSTEM, PARKING MANAGEMENT METHOD, AND PARKING MANAGEMENT PROGRAM

CROSS REFERENCE TO RELATED APPLICATIONS

This application is based upon and claims the benefit of priority from Japanese patent application No. 2021-171488, filed on Oct. 20, 2021, the disclosure of which is incorporated herein in its entirety by reference.

BACKGROUND

The present disclosure relates to a parking management apparatus, a parking management system, a parking management method, and a parking management program.

When a user travels to a destination by a vehicle, it is preferable that the vehicle be able to easily enter a parking lot such as a coin parking lot. Therefore, for example, as disclosed in Japanese Unexamined Patent Application Publication No. 2002-303520, a parking lot information distribution method has been developed for transmitting, based on position information of a parking lot within the range of map information displayed on a display of a navigation system, information indicating whether or not there is an available parking space in the parking lot to the navigation system.

SUMMARY

The applicant has found the following problem. In a general parking lot, use of ancillary facilities (e.g., mechanical baffles) of the parking lot are required in order to start management of a parking service related to the entry of a vehicle into the parking lot and the exit of a vehicle from the parking lot.

The present disclosure has been made in view of the above-described problem and provides a parking management apparatus, a parking management system, a parking management method, and a parking management program that are capable of starting management of a parking service without requiring use of ancillary facilities of a parking lot.

A first exemplary aspect is a parking management apparatus configured to manage a parking service, the parking management apparatus including:
  a position information acquisition unit configured to acquire position information of a vehicle;
  a destination information acquisition unit configured to acquire destination information of the vehicle;
  a creation unit configured to create vicinity parking lot information of a vicinity of a destination provided to the vehicle based on the position information of the vehicle, the destination information of the vehicle, and wide-area parking lot information of a preset area; and
  a management unit configured to specify a parking lot where the vehicle has entered based on the position information of the vehicle and the wide-area parking lot information or the vicinity parking lot information and start the management of the parking service in the parking lot.

The above-described parking management apparatus may include a vicinity information acquisition unit configured to acquire vicinity environment information of the vehicle,
  in which the management unit may determine whether or not the vehicle is parked in a preset parking space of the parking lot based on the vicinity environment information of the vehicle and start, when the vehicle is parked in the preset parking space of the parking lot, the management of the parking service in the parking lot.

In the above-described parking management apparatus, the management unit may create, when the vehicle is not parked in the preset parking space of the parking lot, information provided to the vehicle to notify the vehicle that the vehicle is not parked in the parking space.

The above-described parking management apparatus may include a settlement unit configured to settle a parking fee of the vehicle in the parking lot, in which
  the management unit may determine whether or not the vehicle has left the parking lot based on the position information of the vehicle and the wide-area parking lot information or the vicinity parking lot information and calculate the parking fee for a period from when the management of the parking service in the parking lot is started to when the vehicle leaves the parking lot, and
  the settlement unit may settle the parking fee based on information indicating the calculated parking fee and user information of the vehicle.

Another exemplary aspect is a parking management system including:
  the above-described parking management apparatus;
  a position detection unit configured to detect a position of the vehicle;
  an input unit configured to input a destination, the input unit being provided in a mobile terminal or the vehicle;
  a display unit configured to display the vicinity parking lot information, the display unit being provided in the mobile terminal or the vehicle; and
  a storage unit configured to store the wide-area parking lot information,
  in which the mobile terminal or the vehicle is connected to the parking management apparatus through a network.

Another exemplary aspect is a parking management method for managing a parking service, the parking management method including:
  acquiring position information of a vehicle;
  acquiring destination information of the vehicle;
  creating vicinity parking lot information of a vicinity of a destination provided to the vehicle based on the position information of the vehicle, the destination information of the vehicle, and wide-area parking lot information of a preset area; and
  specifying a parking lot where the vehicle has entered based on the position information of the vehicle and the wide-area parking lot information or the vicinity parking lot information and starting the management of the parking service in the parking lot.

Another exemplary aspect is a parking management program for managing a parking service, the parking management program causing a computer to:
  acquire position information of a vehicle;
  acquire destination information of the vehicle;
  create vicinity parking lot information of a vicinity of a destination provided to the vehicle based on the position information of the vehicle, the destination information of the vehicle, and wide-area parking lot information of a preset area; and
  specify a parking lot where the vehicle has entered based on the position information of the vehicle and the wide-area parking lot information or the vicinity parking lot information and start the management of the parking service in the parking lot.

According to the present disclosure, it is possible to provide a parking management apparatus, a parking management system, a parking management method, and a parking management program that are capable of starting management of a parking service without requiring use of ancillary facilities of a parking lot.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereinafter in detail with reference to the drawings. However, the present disclosure is not limited to the following embodiments. Further, for the clarification of the description, the following descriptions and the drawings are simplified as appropriate.

First Embodiment

A parking management system, a parking management apparatus, and a parking management method according to this embodiment are suitably used to manage a parking service related to, for example, the entry of a vehicle into a parking lot and the exit of a vehicle from the parking lot. First, a configuration of the parking management system according to this embodiment will be described.

Figure 1:
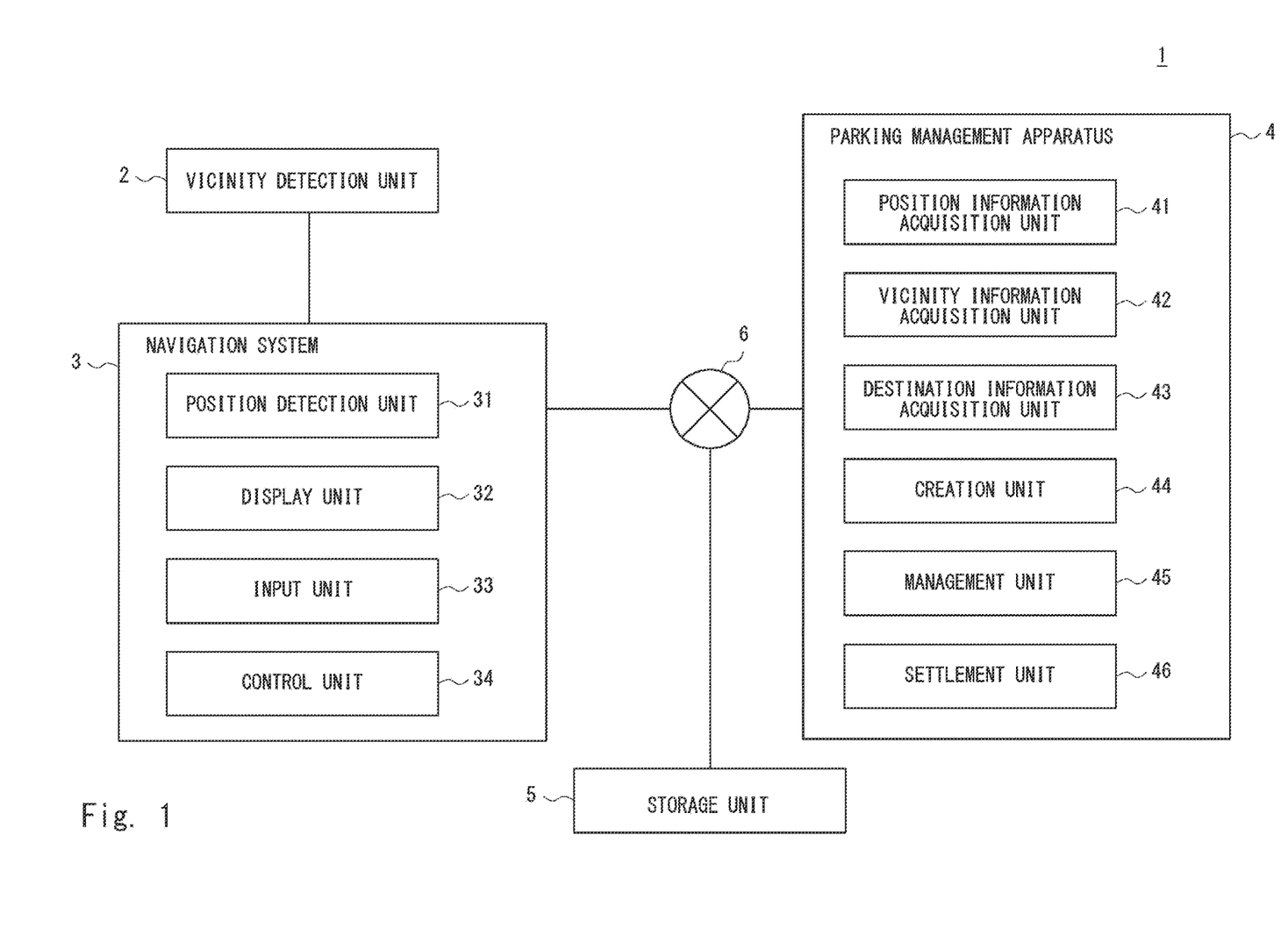
FIG. 1 is a block diagram showing a configuration of a parking management system according to a first embodiment.

FIG. 1 is a block diagram showing the configuration of the parking management system according to this embodiment. As shown in FIG. 1, a parking management system 1 includes a vicinity detection unit 2, a navigation system 3, a parking management apparatus 4, and a storage unit 5.

The vicinity detection unit 2 detects an environment in the vicinity of a vehicle. The vicinity detection unit 2 includes, for example, a camera, a LiDar (Light Detection and ranging), or a millimeter wave sensor. The vicinity detection unit 2 detects, for example, the shape of an object located in the vicinity of the vehicle and the distance from the vehicle to the object as an environment in the vicinity of the vehicle. The vicinity detection unit 2, for example, is mounted on the vehicle and is connected to the navigation system 3 so that they can communicate with each other.

The navigation system 3 is connected to a network 6. Note that the network 6 is, for example, the Internet, and is constructed of a telephone line network, a wireless communication channel, an Ethernet (registered trademark), or the like.

The navigation system 3 is mounted on the vehicle. The navigation system 3 includes a position detection unit 31, a display unit 32, an input unit 33, and a control unit 34. The position detection unit 31 detects a position of the vehicle. The position detection unit 31 detects a position of the vehicle based on information received from a satellite positioning system such as a Global Positioning System (GPS).

The display unit 32 displays vicinity environment information of the vehicle, position information of the vehicle, vicinity map information of the vicinity of the current position of the vehicle, route information, vicinity parking lot information of the vicinity of the destination, and the like. The display unit 32 includes, for example, a liquid crystal display or an organic Electro Luminescence (EL) display. The vicinity parking lot information will be described later.

The input unit 33 is operated by a user of the vehicle to input a destination and the like. The input unit 33 includes, for example, a touch panel stacked on the display unit 32. However, the input unit 33 may have any configuration in which a destination and the like can be input.

The control unit 34 creates route information indicating a route on which a vehicle travels based on input destination information, position information of the vehicle, wide-area map information, and the like. Then the control unit 34 controls the display unit 32 so as to display the vicinity environment information of the vehicle, the position information of the vehicle, the vicinity map information, the route information, and the vicinity parking lot information on the display unit 32. Note that the wide-area map information is, for example, map information of the whole country which is a representative example of a preset area.

The parking management apparatus 4, which is connected to the network 6, includes a position information acquisition unit 41, a vicinity information acquisition unit 42, a destination information acquisition unit 43, a creation unit 44, a management unit 45, and a settlement unit 46. The position information acquisition unit 41 acquires position information of the vehicle detected by the position detection unit 31 of the navigation system 3.

The vicinity information acquisition unit 42 acquires vicinity environment information of the vehicle detected by the vicinity detection unit 2. The destination information acquisition unit 43 acquires destination information of the vehicle input through the input unit 33 of the navigation system 3.

The creation unit 44 creates vicinity parking lot information of the vicinity of the destination provided to the vehicle based on the position information of the vehicle, the destination information of the vehicle, and wide-area parking lot information. The wide-area parking lot information may be information indicating, for example, positions (addresses) of parking lots in the whole country which is a representative example of a preset area, a parking fee per unit time, a preset position of a parking space, and whether or not there is an available parking space in the parking lot.

The vicinity parking lot information may be information indicating, for example, a position of a parking lot in the vicinity of the destination, a position of a preset parking space, whether or not there is an available parking space in the parking lot, a parking fee per unit time, and a result of the comparison between this parking fee and the average parking fee of the vicinity parking lots. However, these contents of the parking lot information can be changed as appropriate. Further, the wide-area parking lot information may be incorporated into the wide-area map information, while the vicinity parking lot information may be incorporated into the vicinity map information.

Note that the preset parking space is, for example, a time rental parking space in a case in which a monthly parking space and a time rental parking space are both available. However, the preset parking space may be a pay parking space or a free parking space as long as it is a temporary parking space.

The management unit 45, based on the position information of the vehicle and the vicinity parking lot information (may instead be the wide-area parking information), specifies a parking lot where the vehicle has entered, starts management of a parking service in the parking lot, determines whether or not the vehicle has left the parking lot, and calculates a parking fee for the period from when the management of the parking service in the parking lot is started to when the vehicle leaves the parking lot.

At this time, the management unit 45, based on the vicinity environment information of the vehicle and the vicinity parking lot information (may instead be the wide-area parking information), may determine whether or not the vehicle is parked in a preset parking space of the parking lot, start the management of the parking service in the parking lot when the vehicle is parked in the preset parking space of the parking lot, and create information provided to the vehicle to notify the vehicle that the vehicle is not parked in the preset parking space when the vehicle is not parked in the preset parking space of the parking lot.

The settlement unit 46 settles the parking fee of the vehicle in the parking lot based on parking fee information calculated by the management unit 45 and user information of the vehicle. The settlement unit 46 settles the parking fee from the account of a user who owns the vehicle based on, for example, identification information of the user who owns the vehicle and identification information of the account of the user registered for settlement, which are items of the user information of the vehicle.

The identification information of the user who owns the vehicle is, for example, information indicating the address, name, and contact information of the user and the type and the license number of the vehicle owned by the user. The identification information of the account of the user is, for example, information indicating the address, name, contact information of the user, the type and the license number of the vehicle owned by the user, and the number and the balance of the account. These contents of the identification information can be changed as appropriate.

The storage unit 5 stores the wide-area map information, the wide-area parking lot information, the identification information of the user who owns the vehicle, and the identification information of the account of the user. The storage unit 5 is connected to the network 6. Therefore, the navigation system 3, the parking management apparatus 4, and the storage unit 5 are connected to one another through the network 6 so that information can be transmitted and received therebetween. Note that the vicinity detection unit 2 may be connected to the network 6 without the navigation system 3 interposed therebetween.

Figure 2:
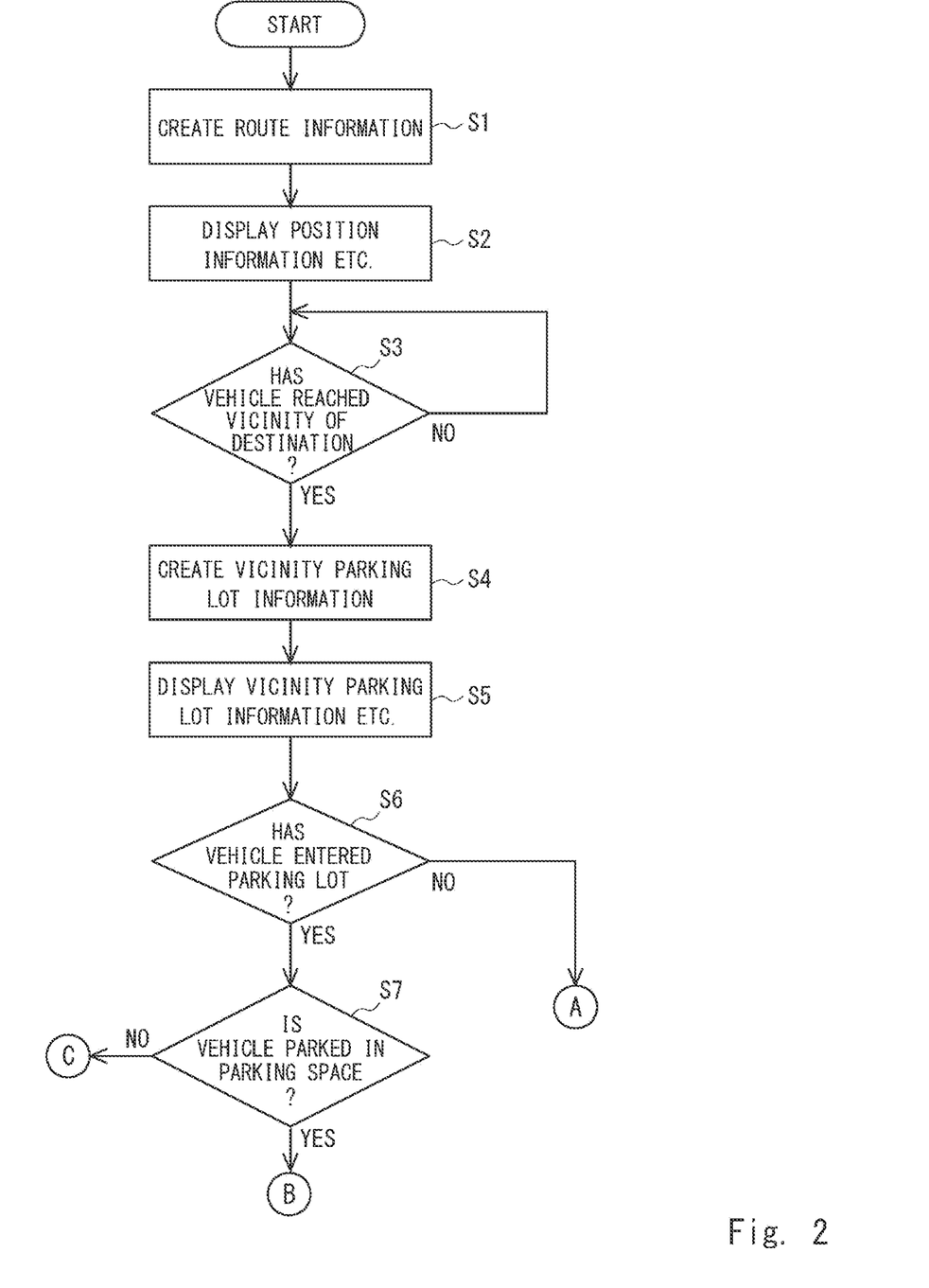
FIG. 2 is a flowchart showing a flow of parking management processes performed by using the parking management system according to the first embodiment.
Figure 3:
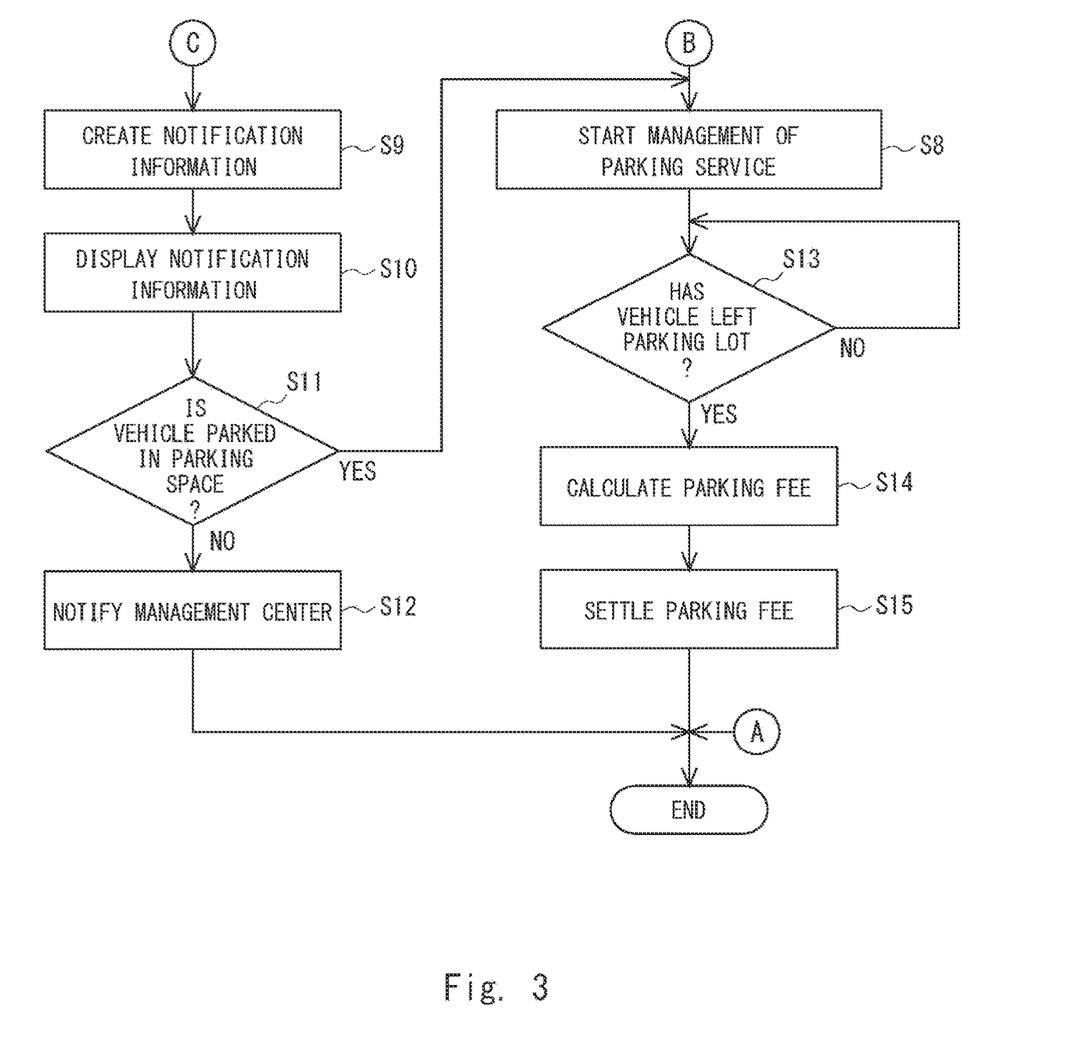
FIG. 3 is a flowchart showing a flow of parking management processes performed by using the parking management system according to the first embodiment.
Figure 4:
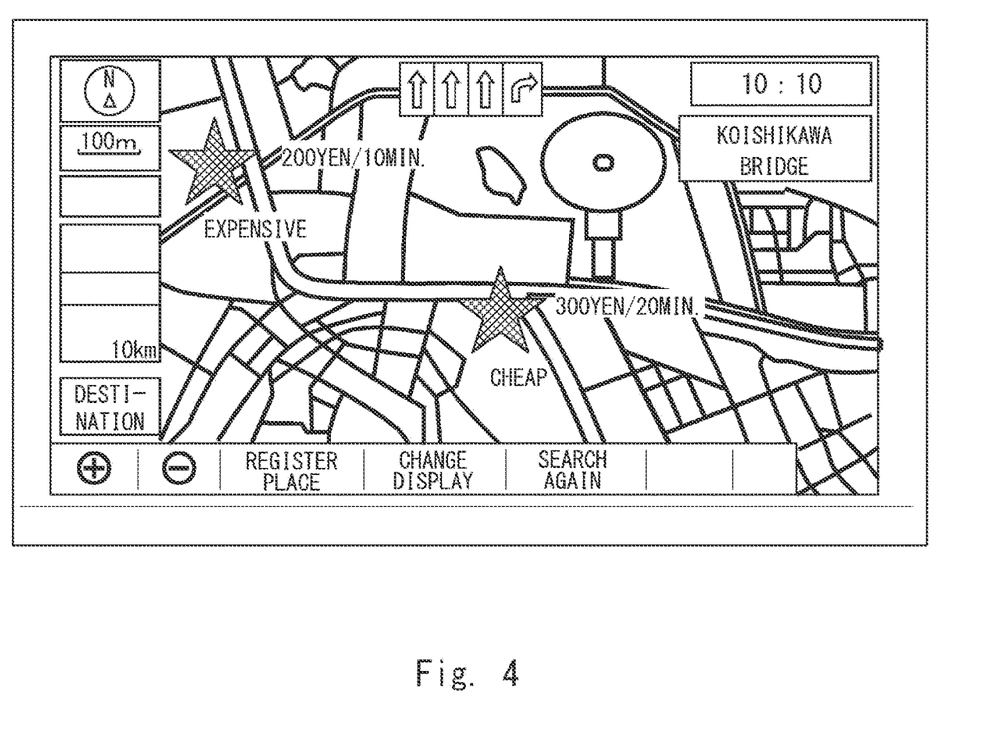
FIG. 4 is a diagram showing a state in which vicinity parking lot information is displayed.
Figure 5:
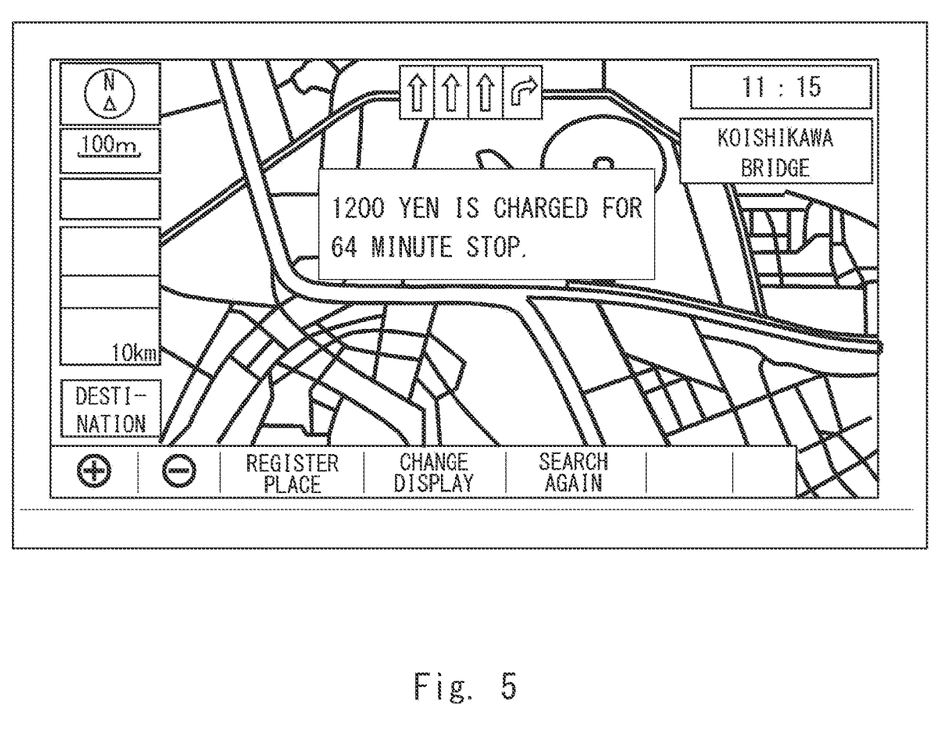
FIG. 5 is a diagram showing a state in which settlement result information is displayed.

Next, a flow of parking management processes performed by using the parking management system according to this embodiment will be described. Note that the parking management method according to the present disclosure includes the processes performed by the parking management apparatus 4. Each of FIGS. 2 and 3 is a flowchart showing the flow of the parking management processes performed by using the parking management system according to this embodiment. FIG. 4 is a diagram showing a state in which vicinity parking lot information is displayed. FIG. 5 is a diagram showing a state in which settlement result information is displayed.

First, when a user of a vehicle inputs a destination through the input unit 33 of the navigation system 3, the control unit 34 of the navigation system 3 creates route information indicating a route on which the vehicle travels based on destination information, position information of the vehicle, wide-area map information, and the like (S1).

Next, the display unit 32 of the navigation system 3 displays the position information of the vehicle, vicinity map information, and the route information on the display unit 32 (S2). Then the user of the vehicle drives the vehicle while referring to the position information of the vehicle, the vicinity map information, and the route information displayed on the display unit 32 of the navigation system 3.

Next, the creation unit 44 of the parking management apparatus 4 determines whether or not the vehicle has reached the vicinity of the destination based on the position information of the vehicle, the destination information, and the vicinity map information (may instead be the wide-area map information) (S3). If the vehicle has not reached the vicinity of the destination (NO in S3), the process returns to S3.

On the other hand, if the vehicle has reached the vicinity of the destination (YES in S3), the creation unit 44 of the parking management apparatus 4 creates vicinity parking lot information of the vicinity of the destination provided to the vehicle based on the position information of the vehicle, the destination information of the vehicle, and wide-area parking lot information (S4).

Next, as shown in FIG. 4, the display unit 32 of the navigation system 3 displays the vicinity parking lot information together with the position information of the vehicle, the vicinity map information, and the route information (S5). Note that the vicinity parking lot information shown in FIG. 4 indicates the position of the parking lot using a star, and it also indicates a parking fee per unit time and a result of the comparison between this parking fee and the average parking fee of the vicinity parking lots.

Next, the management unit 45 of the parking management apparatus 4 determines whether or not the vehicle has entered the parking lot based on the position information of the vehicle and the vicinity parking lot information (may instead be the wide-area parking information) (S6). If the vehicle has not entered the parking lot (NO in S6) and the vehicle has stopped for a predetermined period of time, the management unit 45 of the parking management apparatus 4 ends the parking management process.

On the other hand, if the vehicle has entered the parking lot (YES in S6), the management unit 45 of the parking management apparatus 4 specifies the parking lot where the vehicle has entered based on the position information of the vehicle and the vicinity parking lot information, and further determines whether or not the vehicle is parked in a preset parking space of the parking lot based on vicinity environment information of the vehicle and the vicinity parking lot information (S7).

If the vehicle is parked in the preset parking space (YES in S7), the management unit 45 of the parking management apparatus 4 starts management of a parking service in the parking lot (S8). Note that when the user parks the vehicle, the display unit 32 of the navigation system 3 may display the vicinity environment information of the vehicle. By doing so, the user of the vehicle can park the vehicle in the parking space of the parking lot while referring to the environment in the vicinity of the vehicle.

If the vehicle is not parked in the preset parking space (NO in S7), the management unit 45 of the parking management apparatus 4 creates information provided to the vehicle to notify the vehicle that the vehicle is not parked in the preset parking space (S9).

The display unit 32 of the navigation system 3 displays information indicating that the vehicle is not parked in the preset parking space, and prompts the user of the vehicle to correct the parking space (S10). Then the management unit 45 of the parking management apparatus 4 again determines whether or not the vehicle is parked in the preset parking space (S11).

If the vehicle is parked in the preset parking space (YES in S11), the process proceeds to S8. On the other hand, if the vehicle is not parked in the preset parking space (NO in S11), the management unit 45 of the parking management apparatus 4 notifies, for example, a management center of the parking lot that there is a vehicle that is not parked in the preset parking space (S12), and the management unit 45 ends the parking management process.

Next, the management unit 45 of the parking management apparatus 4 determines whether or not the vehicle has left the parking lot based on the position information of the vehicle and the vicinity parking lot information (S13). If the vehicle has not left the parking lot (NO in S13), the process returns to S13.

On the other hand, if the vehicle has left the parking lot (YES in S13), the management unit 45 of the parking management apparatus 4 calculates a parking fee for the period from when the management of the parking service in the parking lot is started to when the vehicle leaves the parking lot (S14). At this time, the management unit 45 updates information indicating whether or not there is an available parking space in the parking lot in the wide-area map information.

Next, the settlement unit 46 of the parking management apparatus 4 settles the parking fee of the vehicle in the parking lot based on parking fee information calculated by the management unit 45 and user information of the vehicle (S15), and ends the parking management process. At this time, as shown in FIG. 5, settlement result information may be displayed on the display unit 32 of the navigation system 3. Further, a menu, for example, for communicating with the management center of the parking lot, may also be displayed.

As described above, in the parking management system 1, the parking management apparatus 4, and the parking management method according to this embodiment, the entry of a vehicle into a parking lot is recognized based on position information of the vehicle and parking lot information, and thus it is possible to start management of a parking service without requiring use of ancillary facilities of the parking lot.

Moreover, in the parking management system 1, the parking management apparatus 4, and the parking management method according to this embodiment, the exit of a vehicle from the parking lot is recognized based on the position information of the vehicle and the parking lot information, and thus it is possible at this time to end the management of the parking service.

Further, in the parking management system 1, the parking management apparatus 4, and the parking management method according to this embodiment, when the vehicle is not parked in a preset parking space, the management unit 45 gives a notification that the vehicle is not parked in the preset parking space through the display unit 32 of the navigation system 3, and therefore it is possible to notify the user of the vehicle that the vehicle is not parked in the preset parking space.

Furthermore, in the parking management system 1, the parking management apparatus 4, and the parking management method according to this embodiment, the management unit 45 calculates a parking fee and the settlement unit 46 settles the parking fee, and therefore it is possible not only to manage the entry and exit of the vehicle but also to settle the parking fee without requiring use of ancillary facilities of the parking lot.

Second Embodiment

Figure 6:
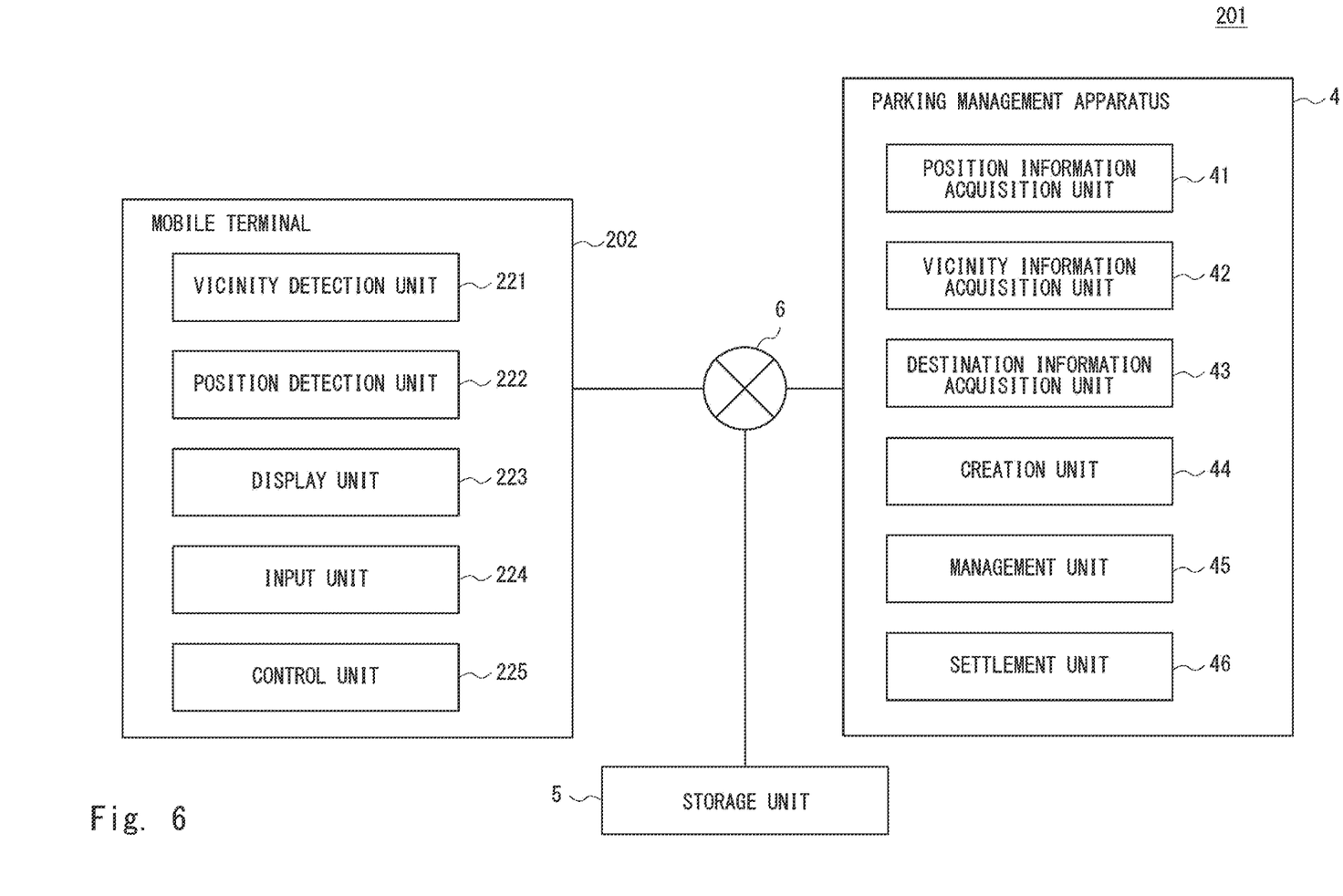
FIG. 6 is a block diagram showing a configuration of a parking management system according to a second embodiment.

FIG. 6 is a block diagram showing a configuration of a parking management system according to this embodiment. As shown in FIG. 6, a parking management system 201 includes a vicinity detection unit 221, a position detection unit 222, a display unit 223, an input unit 224, and a control unit 225 in a mobile terminal 202 owned by a user of a vehicle. That is, the parking management system 201 according to this embodiment includes the mobile terminal 202 instead of the navigation system 3 according to the first embodiment.

Note that the mobile terminal 202 is, for example, a tablet Personal Computer (PC) or a smartphone. For example, the mobile terminal 202 is fixed to a dashboard of the vehicle, whereby it is possible for the vicinity detection unit 221 to detect an environment in the front vicinity of the vehicle and for the position detection unit 222 to detect the position of the vehicle.

Note that the mobile terminal 202 may be disposed at a position where a user of the vehicle can visually recognize vicinity map information and the like. Further, the user of the vehicle or the like may get off the vehicle and then detect an environment in the vicinity of the vehicle through the vicinity detection unit 221 of the mobile terminal 202.

Note that the storage unit 5 may associate an identification ID, an e-mail address, and the like of the mobile terminal 202 with identification information of a user who owns the vehicle and store them as identification information of the mobile terminal 202.

The parking management system 201 described above can perform the parking management processes in a flow similar to that of the processes performed by the parking management system 1 according to the first embodiment. Therefore, in the parking management system 201, the parking management apparatus 4, and the parking management method according to this embodiment, it is possible to start management of a parking service without requiring use of ancillary facilities of the parking lot.

OTHER EMBODIMENTS

Note that, although the present disclosure has been described as a hardware configuration in the above first and second embodiments, the present disclosure is not limited thereto. In the present disclosure, processing of each component can also be implemented by causing a Central Processing Unit (CPU) to execute a computer program.

Figure 7:
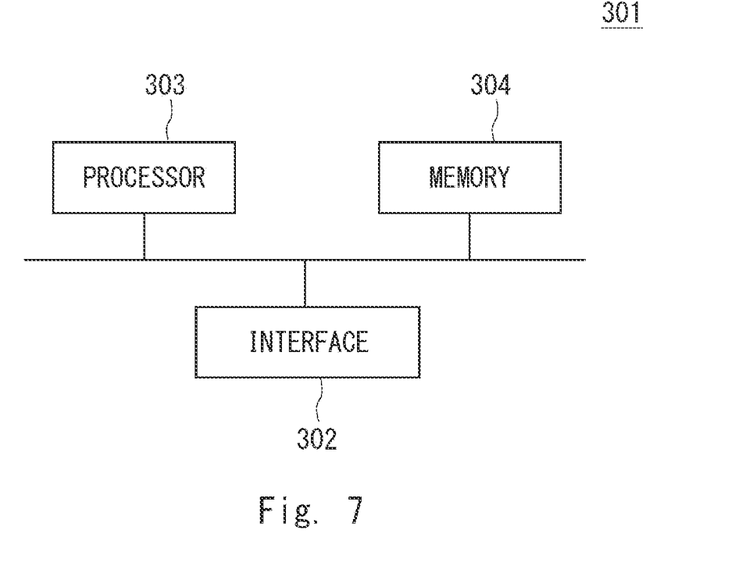
FIG. 7 shows an example of a hardware configuration included in the parking management apparatus.

For example, the parking management apparatus 4 according to the above-described embodiments can include the following hardware configuration. FIG. 7 shows an example of the hardware configuration included in the parking management apparatus 4.

An apparatus 301 shown in FIG. 7 includes an interface 302, a processor 303, and a memory 304. The parking management apparatus 4 described in the above first and second embodiments is implemented by the processor 303 loading and executing a program stored in the memory 304. That is, this program is a program for causing the processor 303 to function as the parking management apparatus 4.

Note that the program includes instructions (or software codes) that, when loaded into a computer, cause the computer to perform one or more of the functions. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the above-described embodiments and may be changed as appropriate without departing from the spirit of the present disclosure.

In the above-described embodiments, although a destination is input through the input unit 33 of the navigation system 3 or the input unit 224 of the mobile terminal 202, a destination that is frequently input may be input automatically.

In the above-described embodiments, although a user receives a notification that a vehicle is not parked in a predetermined parking space in a parking lot through the display unit, any notification method may be employed. For example, a user may receive the notification by voice. Further, the configuration for checking whether a vehicle is parked in a preset parking space and notifying a user that a vehicle is not parked in the parking space may be omitted.

In the above-described embodiments, the parking management apparatus 4 includes the settlement unit 46. Instead of this configuration, for example, a settlement unit of a credit card company or the like may be connected to the network 6 and a settlement may be performed based on an instruction from the parking management apparatus 4. Further, the configuration for settling a parking fee may be omitted.

In the above-described embodiments, the parking management apparatus 4 manages information indicating whether or not there is an available parking space in a parking lot, and the like. However, the parking fee, the information indicating whether or not there is an available parking space in a parking lot, and the like may be acquired from a parking lot management company through the network 6.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A parking management apparatus configured to manage a parking service, the parking management apparatus comprising:
    a position information acquisition unit configured to acquire position information of a vehicle;
    a vicinity information acquisition unit configured to acquire vicinity environment information of the vehicle;
    a destination information acquisition unit configured to acquire destination information of the vehicle, the destination information is input by a user;
    a creation unit configured to create vicinity parking lot information of a vicinity of a destination provided to the vehicle based on the position information of the vehicle, the destination information of the vehicle, and wide-area parking lot information of a preset area, the wide-area parking lot information of the preset area indicates positions of parking lots of the preset area, a parking fee per unit time, a present position of a parking space, and whether there is an available parking space in the parking lots of the preset area; and
    a management unit configured to:
        specify a parking lot where the vehicle has entered based on the position information of the vehicle and the wide-area parking lot information or the vicinity parking lot information, start the management of the parking service in the parking lot, the start of the management of the parking service is related to an entry of the vehicle into the parking lot and an exit of the vehicle from the parking lot, determine whether or not the vehicle has exited the parking lot, and calculate the parking fee per unit time for a time period from when the management of the parking service in the parking lot is started to when the vehicle exits the parking lot; and
        determine whether or not the vehicle is parked in a preset parking space of the parking lot based on the vicinity environment information of the vehicle, start the management of the parking service in the parking lot when the vehicle is parked in the preset parking space of the parking lot, and create, when the vehicle is not parked in the preset parking space of the parking lot, information provided to the vehicle to notify the vehicle that the vehicle is not parked in the preset parking space.

2. The parking management apparatus according to claim 1, comprising a settlement unit configured to settle the parking fee of the vehicle in the parking lot
    based on information indicating the calculated parking fee and user information of the vehicle.

3. A parking management system comprising:
    the parking management apparatus according to claim 1;
    a position detection unit configured to detect a position of the vehicle;
    an input unit configured to input a destination, the input unit being provided in a mobile terminal or the vehicle;
    a display unit configured to display the vicinity parking lot information, the display unit being provided in the mobile terminal or the vehicle; and
    a storage unit configured to store the wide-area parking lot information,
    wherein the mobile terminal or the vehicle is connected to the parking management apparatus through a network.

4. A parking management method for managing a parking service, the parking management method comprising:

acquiring position information of a vehicle;

acquiring destination information of the vehicle, the destination information is input by a user;

acquiring vicinity environment information of the vehicle;

creating vicinity parking lot information of a vicinity of a destination provided to the vehicle based on the position information of the vehicle, the destination information of the vehicle, and wide-area parking lot information of a preset area, the wide-area parking lot information of the preset area indicates positions of parking lots of the preset area, a parking fee per unit time, a present position of a parking space, and whether there is an available parking space in the parking lots of the preset area;

specifying a parking lot where the vehicle has entered based on the position information of the vehicle and the wide-area parking lot information or the vicinity parking lot information, starting the management of the parking service in the parking lot related to an entry of the vehicle into the parking lot and an exit of the vehicle from the parking lot, determining whether or not the vehicle has exited the parking lot, and calculating the parking fee per unit time for a time period from when the management of the parking service in the parking lot is started to when the vehicle exits the parking lot; and determining whether or not the vehicle is parked in a preset parking space of the parking lot based on the vicinity environment information of the vehicle, starting the management of the parking service in the parking lot when the vehicle is parked in the preset parking space of the parking lot, and creating, when the vehicle is not parked in the preset parking space of the parking lot, information provided to the vehicle to notify the vehicle that the vehicle is not parked in the preset parking space.

5. A non-transitory computer readable medium storing a parking management program for managing a parking service, the parking management program causing a computer to:

acquire position information of a vehicle;

acquire destination information of the vehicle, the destination information is input by a user;

acquire vicinity environment information of the vehicle;

create vicinity parking lot information of a vicinity of a destination provided to the vehicle based on the position information of the vehicle, the destination information of the vehicle, and wide-area parking lot information of a preset area, the wide-area parking lot information of the preset area indicates positions of parking lots of the preset area, a parking fee per unit time, a present position of a parking space, and whether there is an available parking space in the parking lots of the preset area;

specify a parking lot where the vehicle has entered based on the position information of the vehicle and the wide-area parking lot information or the vicinity parking lot information, start the management of the parking service in the parking lot, the start of the management of the parking service is related to an entry of the vehicle into the parking lot and an exit of the vehicle from the parking lot, determine whether or not the vehicle has exited the parking lot, and calculate the parking fee per unit time for a time period from when the management of the parking service in the parking lot is started to when the vehicle exits the parking lot; and determine whether or not the vehicle is parked in a preset parking space of the parking lot based on the vicinity environment information of the vehicle, start the management of the parking service in the parking lot when the vehicle is parked in the preset parking space of the parking lot, and create, when the vehicle is not parked in the preset parking space of the parking lot, information provided to the vehicle to notify the vehicle that the vehicle is not parked in the parking space.

* * * * *